United States Patent [19]

Kanazawa

[11] 4,118,045

[45] Oct. 3, 1978

[54] BICYCLE

[76] Inventor: Kuniyoshi Kanazawa, 2-21-5 Nakamiya, Asahi-ku, Osaka-shi 535, Japan

[21] Appl. No.: 754,100

[22] Filed: Dec. 27, 1976

[30] Foreign Application Priority Data

| Jan. 12, 1976 | [JP] | Japan | 51-1943[U] |
| Apr. 27, 1976 | [JP] | Japan | 51-53740[U] |
| Apr. 27, 1976 | [JP] | Japan | 51-53741[U] |
| Jun. 11, 1976 | [JP] | Japan | 51-76495[U] |
| Jun. 11, 1976 | [JP] | Japan | 51-76496[U] |
| Aug. 30, 1976 | [JP] | Japan | 51-115961[U] |

[51] Int. Cl.² ............................................. B62K 19/04
[52] U.S. Cl. ................................. 280/283; 280/227; 280/259
[58] Field of Search ........... 280/220, 221, 227, 226 R, 280/283, 259

[56] References Cited

U.S. PATENT DOCUMENTS

| 589,328 | 8/1897 | Barton | 280/227 |
| 673,661 | 5/1901 | Reid | 280/227 |

FOREIGN PATENT DOCUMENTS

| 107,638 | 6/1939 | Australia | 280/283 |
| 175,955 | 2/1921 | United Kingdom | 280/283 |

OTHER PUBLICATIONS

Copy of Advertising Brochure for "Evinrude Streamflow Bicycle," received in U.S. Patent Office Jan. 11, 1938.

Primary Examiner—Joseph F. Peters, Jr.
Assistant Examiner—Donn McGiehan
Attorney, Agent, or Firm—John Joseph Hall

[57] ABSTRACT

A bicycle having its saddle support inclusive of a saddle and a crank means elastically suspended from an upper frame independently of its upper and its lower frame in which front and rear wheels are journalled so as to prevent transmission of vertical motion therefrom to the saddle support and also so as to protect, in conjunction with the saddle support, the handle itself against the vertical motion of the wheels.

3 Claims, 12 Drawing Figures

BICYCLE

BACKGROUND OF THE INVENTION

1. Field of the Invention

This invention relates generally to a bicycle and more particularly to a unique bicycle having its saddle support inclusive of a saddle and a drive crank means (pedal crank, crank housing and chain gear) elastically suspended from an upper frame independently of the upper and lower frames in which front and rear wheels are journaled. The invention further relates to a bicycle in which, in combination with such independently suspended saddle support, a handle itself is suspended independently of a front wheel control shaft so as to be free from the vertical motion of the front wheel along without losing handle controlability.

2. Prior Art

It is well known that a seat pillar is elastically inserted into the saddle support for the purpose of absorbing the vertical motion of the front and rear wheels to the saddle, but because this type of bicycle is assembled such that a drive crank means itself is fixed to the lower frame, the center of rotational movement of the crank means follows a change in the axes of the front and rear wheels, with the result that when the bicycle runs along the very rough ground, the relative vertical motion imparted to the rider is reduced in width with respect to the pedal position. Accordingly, cases often occurred in which the rider had to do knee bends so very frequently that he felt fatigued with brisk movement of his legs.

SUMMARY OF THE INVENTION

Accordingly, a primary object of this invention is to provide a bicycle in which the saddle and crank means are independent of its upper and its lower frame in which the front and rear wheels are journaled so as to prevent the transmission of the vertical motion of the latter to the former.

Another object of the invention is to provide a bicycle in which a handle itself is also enabled to keep out of vertical motion from the front and rear wheels in conjunction with the primary object.

Other objects and advantages of the invention will become more apparent from a description of preferred embodiments taken in conjunction with the accompanying drawings.

DESCRIPTION OF THE PREFERRED EMBODIMENTS

A concrete mode of the invention for the purpose of achieving the above objects of the invention may generally be classified into two modes as below:

(I) The saddle and drive crank means are mounted in the upper and lower parts of one saddle support, and are elastically suspended by springs from the upper frame completely independently of the upper and lower frames (illustrated by first to fourth embodiments).

Figure 9:
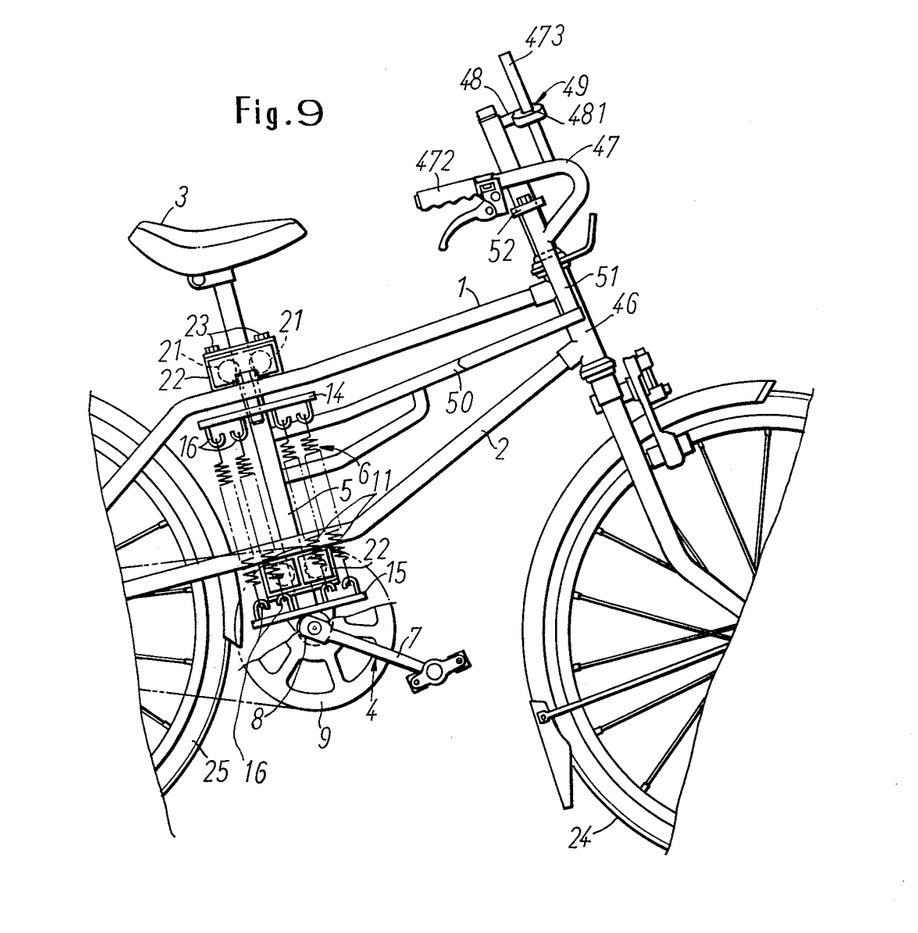
FIG. 9 is a side elevation of a bicycle shown as a fifth embodiment of the invention.
Figure 11:
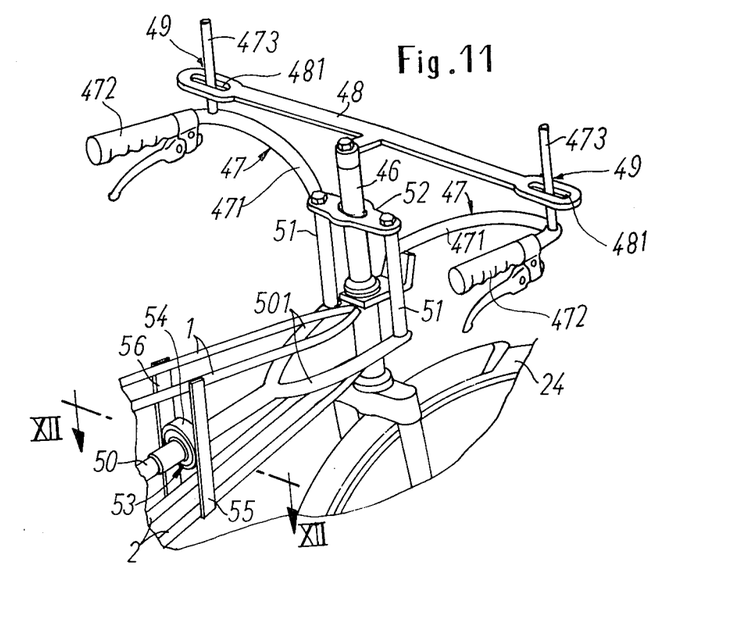
FIG. 11 is a perspective view of a handle assembly of a bicycle shown as a sixth embodiment of the invention.

(II) Independently of a conventional type handle mounted to a front wheel control shaft formed by connecting a main handle to the independent-suspended saddle support in Item (I) (this conventional type handle will hereinafter be referred to as a sub-handle), a sub-handle is connected to the main handle independently of the latter so as to make the sub-handle free to make vertical motion (illustrated by fifth to sixth embodiments).

A further detailed description will now be taken in due order.

(I) The structure common to the first to fourth embodiments comprises a saddle support 5 having a saddle 3 mounted to the upper end thereof and having a drive crank means 4 mounted to the lower end thereof respectively independently of upper and lower frames 1 and 2 and a means for elastically suspending the saddle support 5 from the upper frame 1, the drive crank means 4 including a pedal crank 7, a crank housing 8 and a chain gear 9, and the elastically suspending means 6 including a means 10 for elevatably guiding the saddle support 5 with respect to the upper and lower frames 1 and 2 and a plurality of spring means 11 for elastically suspending the saddle support 5 from the upper frame 1 against the weight of the support 5. The structure described is further classified into first to fourth embodiments depending upon the mode of embodiment of the elastic-suspending means or upon what other means are added to the suspending means.

Figure 1:
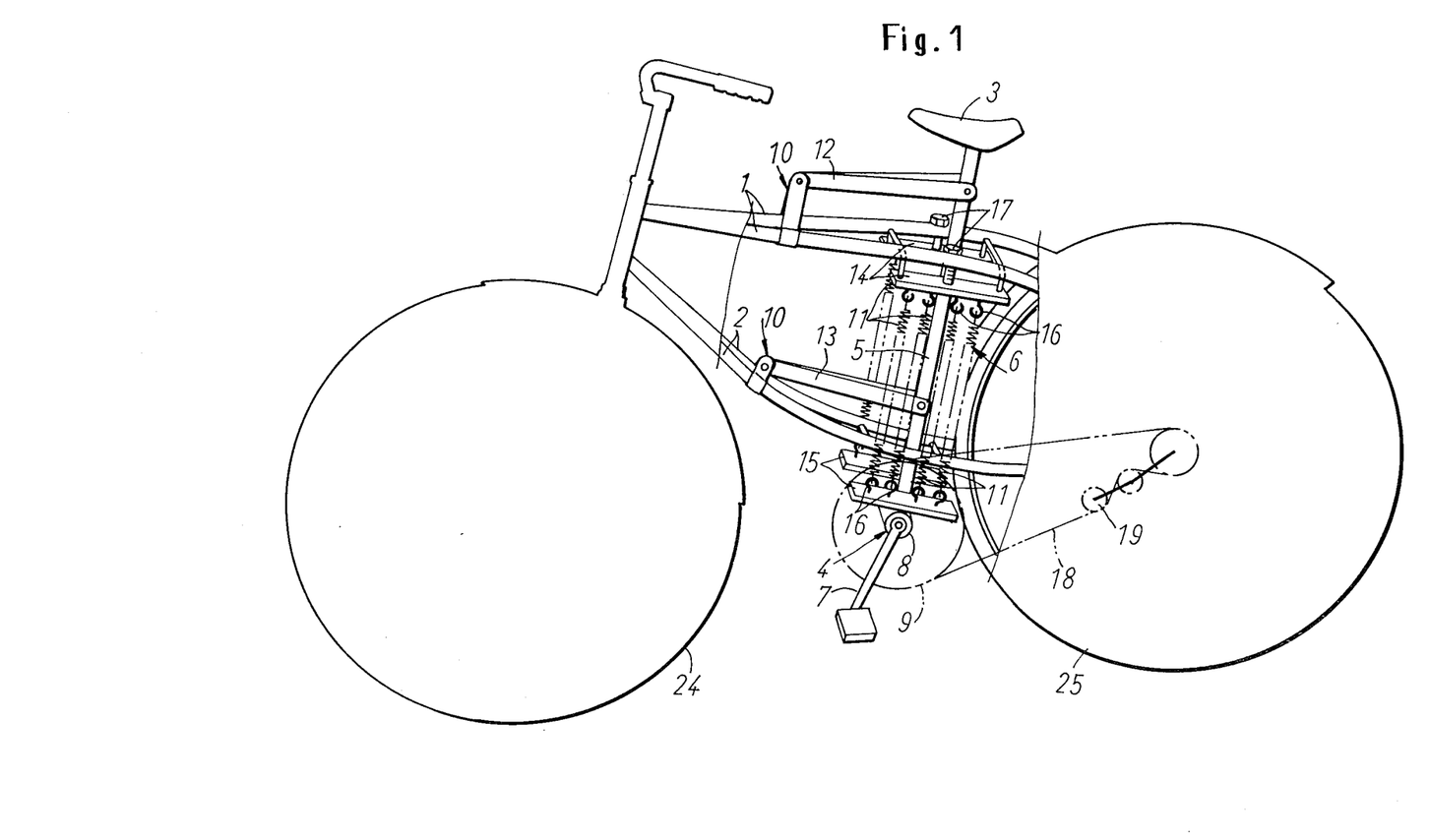
FIG. 1 is a perspective view of a bicycle showing a first embodiment of this invention.

In the first embodiment illustrated in FIG. 1, the elastic-suspending means 6 comprises a saddle support 5 elevatably and vertically inserted between forked and horizontally extending upper frames 1, 1 and likewise between forked lower frames 2,2, elevatable guides 10 respectively extending from the upper and lower frames 1, 1 and 2, 2 and including an upper and a lower pair of rods 12, 13, an upper end plate 14 fixed to the upper frames 1, 1 and a lower end plate 15 secured to the saddle support 5 right above the crank means 4, and a spring means 6 including a group of plural pairs (four pairs herein) of springs 11... mounted in symmetrical position at least bilaterally of the saddle support 5 and having their upper and lower ends hooked respectively between the end plates 14 and 15. Numeral 16 designates hooks fixed to the end plates 14 and 15 and numeral 17 designates adjusting bolts adapted to adjust the resilience of springs 11... by making the upper end plate freely movable toward and away from the upper frames 1, 1 in the direction of expansion and contraction of the spring group. Link rods 12 and 13 each are shown as a two-piece rod, but it should be understood that they are not limited to this type alone. Relaxation of a chain 18 due to up-and-down movement of the crank means 4 is prevented by an idle gear 19 preferably provided.

Figure 2:
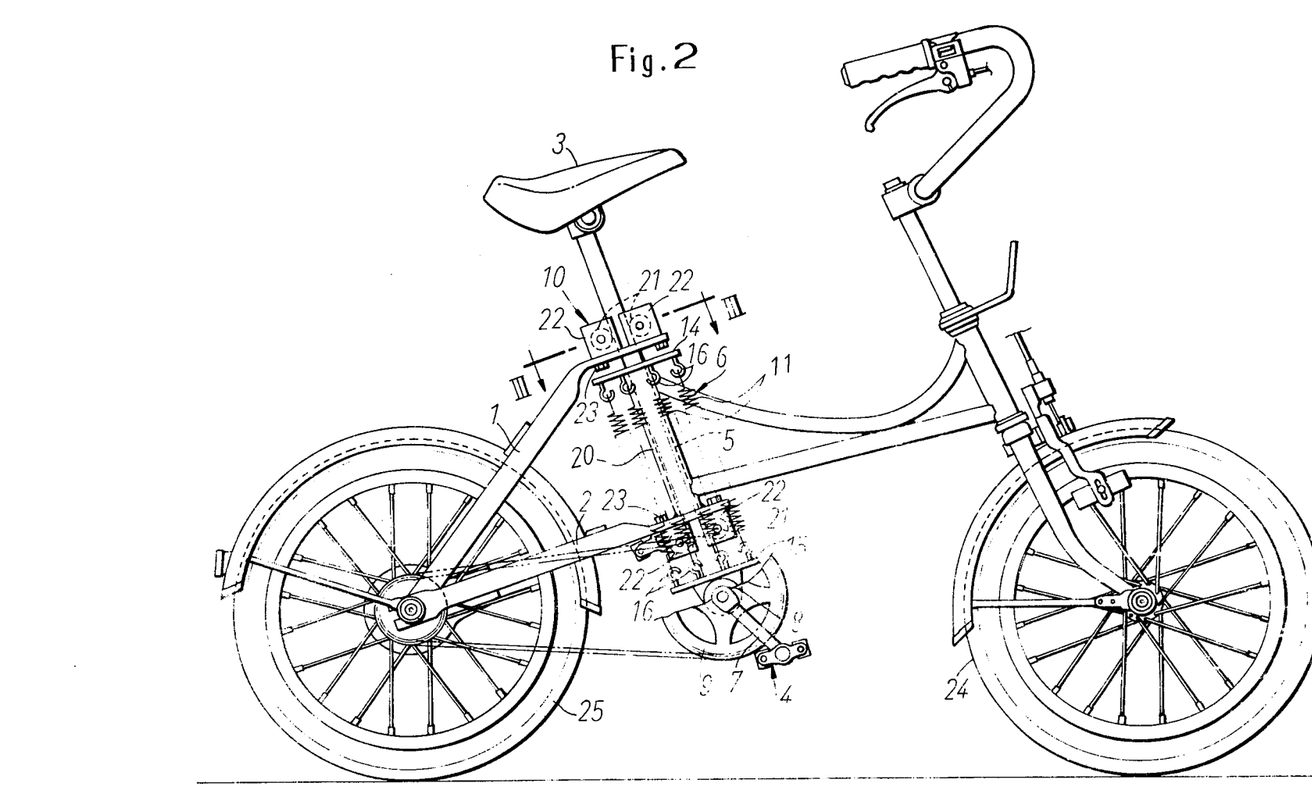
FIG. 2 is a side elevation of a bicycle shown as a second embodiment of the invention.
Figure 3:
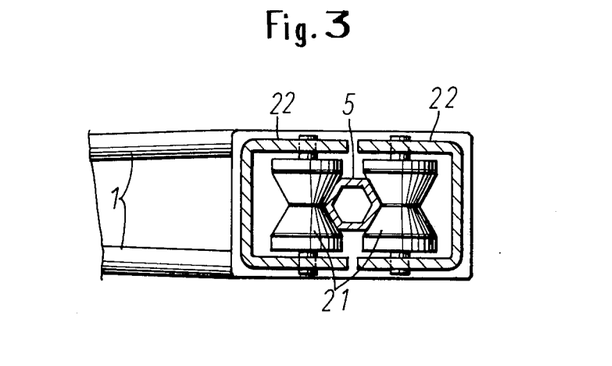
FIG. 3 is an enlarged sectional view taken along line III—III of FIG. 2.

In the second embodiment shown in FIG. 2, the elevatable guide means 10 comprises an outer cylinder 20 bridged between the upper frame 1, 1 and the lower frame 2, 2 and an upper and a lower pair of guid roll boxes 22, 22 fixed to the upper frame 1, 1 and lower frame 2, 2 and containing therein rollers 21, 21 bilaterally pinching the saddle support 5 journaled inside the cylinder 20, and the spring means 6 is the same as that of the first embodiment. The saddle support 5 is a hollow tube hexagonal in section as shown in FIG. 3, and the guide rollers 21, 21 corresponding to the hollow tube are shown as being bobbin-shaped in section but they are not limited to the shape illustrated. Mounting bolts 23, 23 are provided to fix the boxes 22, 22 to the frames 1 and 2.

With the construction of the first and second embodiments as illustrated above, the saddle support 5 is maintained in a completely independent relation with respect to the upper and lower frame 1 and 2 and is elastically suspended from the upper frame, the total body weight of the rider and his pedaling momentum are supported by the saddle support 5, and accordingly the saddle support 5 is substantially free also from the vertical motion of the front wheel 24 and rear wheel 25 within the elastic deformation of the spring group 11. . . , and the relative relation between the saddle 3 and the pedal 7 is constant, with the result that the rider's pedaling operation is always held in the same state even on a rought road. Accordingly, the vertical motion that would otherwise be transmitted by the wheels 24, 25 through the saddle 3 to the rider is not only interrupted but also the constancy of pedaling operation does not bring the rider out of his pedaling rhythm even on a long and very rough road, being very useful in the prevention of rider's fatigue. In addition to this, the weight of the saddle support 5 always depresses the front wheel 24 and rear wheel 25 against the road surface through the spring group 11. . . , and consequently the close contact held between the wheels 24 and 25 and the rough road surface prevents the bicycle from being bounded up and assures an agreeable rider and a less amount of kinetic energy lost (See FIG. 18).

As shown in the first embodiment, adjustment of the tension of the spring group 11. . . by use of bolts 17. . . makes it possible for the rider to select the spring action that suits his body weight. Also, any number of unnecessary springs out of the spring group 11. . . , if necessary, may be beforehand disconnected from hook members 16. Fine, long, soft and elastic spring steel wire is preferably used for the springs 11. If the position in which the springs 11 expand by the weight of the saddle support 5 with the rider sitting astraddle thereof is a neutral position, the springs expand substantially the same length upwardly and downwardly of the neutral position to thereby absorb vertical motion of the front and rear wheels 24 and 25.

It will be understood that the second embodiment makes the elevation of the saddle support 5 easier through gripping of the support 5 by the guide rollers 21 and 21 than the first embodiment. In third and fourth embodiments, a means is taken for positively preventing the saddle support 5 in the preceding embodiments from rotating about the axis of the support 5, and especially consideration is given for preventing the possible rotation caused when the pedal is rotated by imparting a sudden and strong force to the drive crank means 4.

Figure 4:
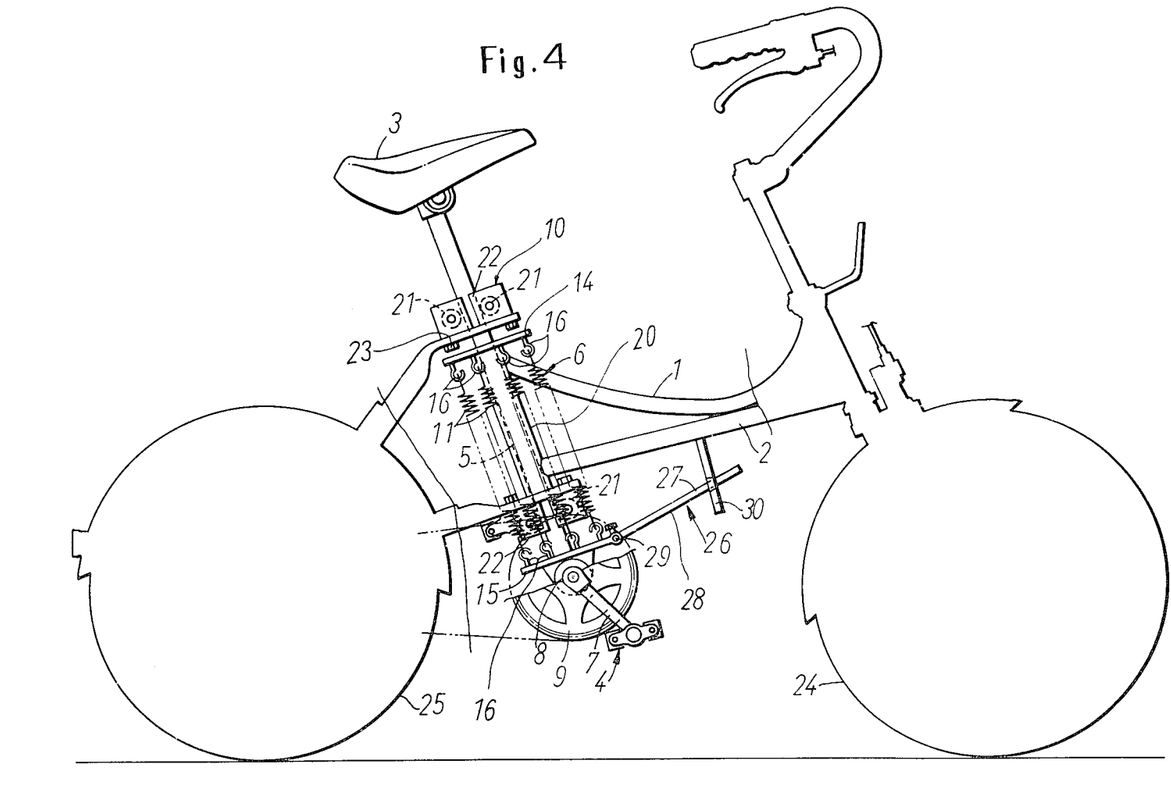
FIG. 4 is a side elevation of a bicycle shown as a third embodiment of the invention.
Figure 5:
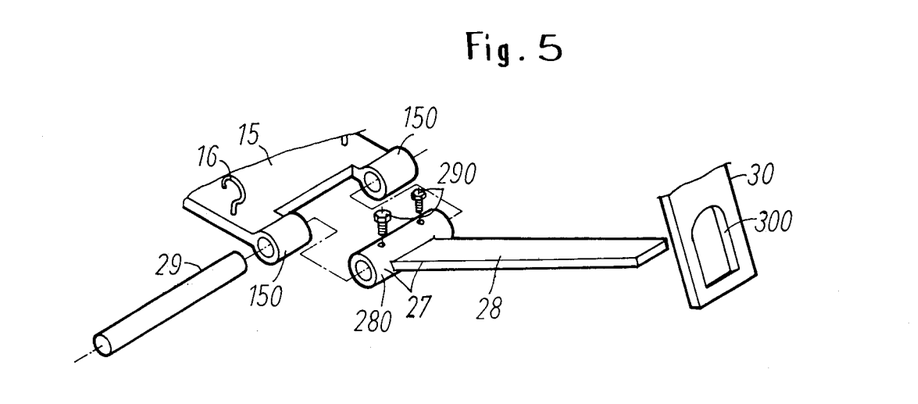
FIG. 5 is an enlarged perspective view of a rotation preventing means in FIG. 4.

Namely, the elastic-suspending means 6 shown in FIG. 4 is the same as that of the second embodiment, but a rotation preventing means 26 for the support 5 is shown as a swinging lever 27 connected between a lever end plate 15 and a lower frame 2. More particularly, bearing portions 150 and 150 are formed in the front end portion of the lower end plate 15, a pin 29 passing longitudinally through a shaft boss of a winglike portion 280 of a lever 27 T-shaped in plane is nonrotatably fixed with set screws 290 and 290 inside the shaft boss of the portion 280, a lever 30 having a vertical hole 300 formed at the lower end thereof is mounted beneath the lower frame 2 so as to extend downwardly from the frame 2, the T-shaped lever 27 is rotatably journaled by the pin 29 in the bearing portions 150 and 150 of the lower end plate 15, and the front end of the lever 27 is inserted into the vertical hole 300 of the lever 30 so as to permit the vertical swing thereof within the hole 300. With the above construction, the lever 27 swings up and down with the pin 29 as a pivot in response to the elevation of the saddle support 5, while the front end of the lever 27 can securely be prevented from bilateral swinging by the wall of the vertical hole 300.

Figure 6:
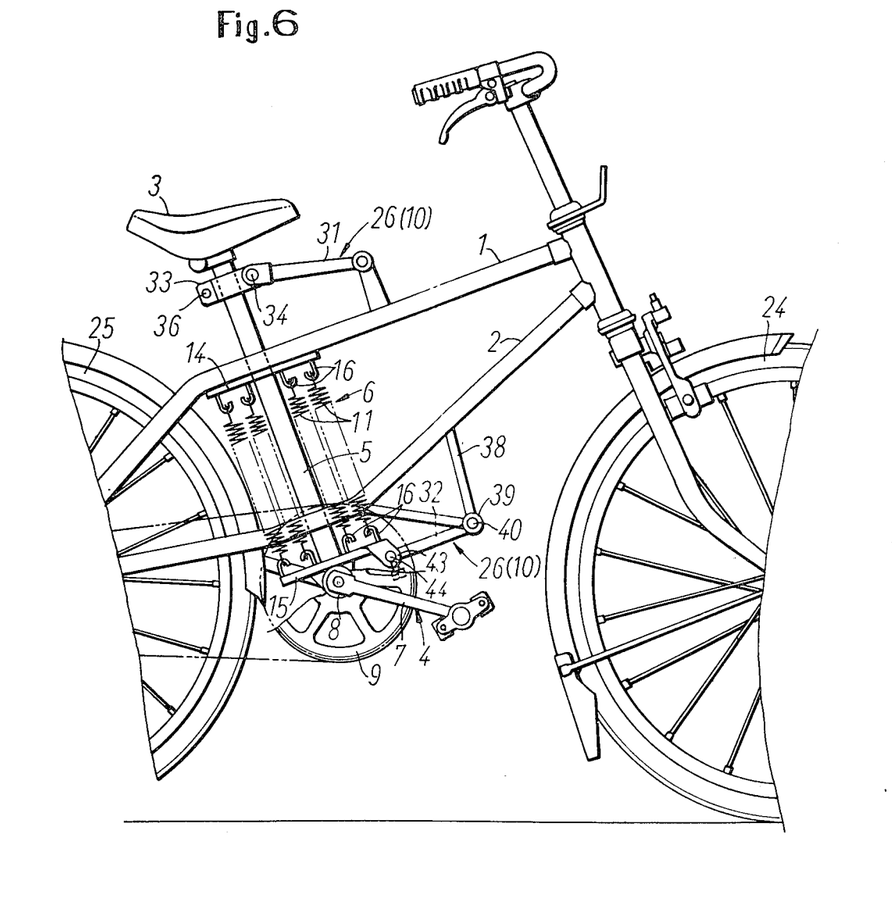
FIG. 6 is a side elevation of a bicycle shown as a fourth embodiment of the invention.
Figure 7:
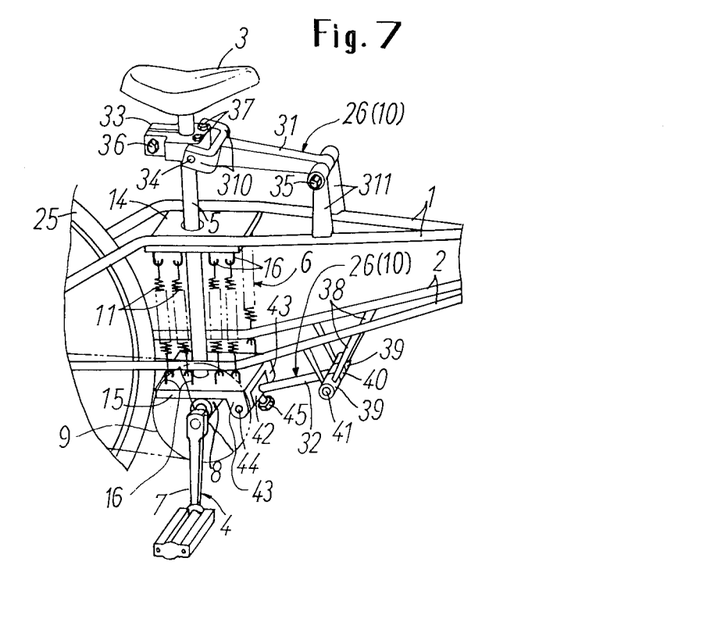
FIG. 7 is an enlarged perspective view of the rotation preventing means in FIG. 6.
Figure 8:
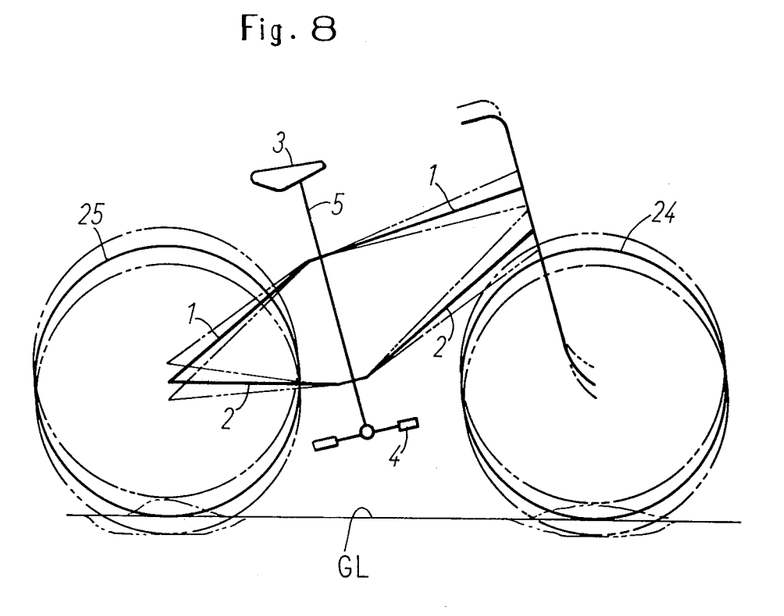
FIG. 8 is a diagram illustrating the moving function of the bicycles shown as embodiments in FIGS. 1 through 4.

In the fourth embodiment shown in FIG. 6, the rotation preventing means 26, which concurrently functions as an elevatable guide means 10, comprises an upper and a lower pair of link arms 31 and 32 respectively connected to the upper part of the saddle support 5 and the upper frame 1 and to the lower end plate 15 and the lower frame 2. More particularly, the link arm 31, as shown in FIG. 7, is pivotally connected at the lower end forked portion 310 by a pivot 34 to a clamper 33 clamping a portion right below the saddle of the saddle support 5, while on the other hand forked stands 311 and 311 are extended from the upper frame 1, 1 and the front end of the arm 31 is pivotally connected by a pivot 35 to the stands 311 and 311. Numeral 36 designates an operating pin of the clamper 33, and 37 designates a set screw for fixing the pivot 34. The link arm 32, as illustrated, has the same structural relation between the lower end plate 15 and the lower frames, 2 as the upper link arm 31. Namely, forked stands 38 and 38 are extended from the lower frames 2 and 2, the stands are formed with shaft bosses 39, 39 which are pivotally connected by a pivot 41 to a shaft boss 40 formed at the front end of the link arm 32, a pivot 44 is supported between a shaft boss 42 formed at the rear end of the arm 32 and bearing portions 43 and 43 formed at the front end of the lower end plate 15, and the rear end of the link arm 32 is pivotally connected to the lower end plate 15. Numeral 45 designates a set screw for the pivot 44. In this embodiment, the upper portion of the saddle support 5 and the lower end plate 15 are connected by the link arms 31 and 32 to the upper frame 1 and the lower frame 2 respectively, and consequently the rotation preventing means is more improved in the ability to prevent the rotation of the saddle support 5 than the rotation peventing means in the third embodiment in FIG. 4. In addition thereto, the rotation preventing means in the fourth embodiment is designed to vertically guide the saddle support 5 by the vertical swinging of the link arms 31 and 32. According to these two embodiments having the rotation preventing means 26' incorporated thereinto, prevention of rotation of the saddle support 5 during pedaling can provide smooth vertical motion of the saddle 3 to thereby assure comfortable drive feeling.

The embodiments in I–IV described above relate to a bicycle having an independent elastic-suspending mechanism of a saddle support incorporated thereinto, while the two embodiments to be hereinafter described relate to a bicycle in which a handle, in combination with the saddle support, is suspended independently of a front wheel control shaft so as to be free from the vertical motion of the front wheel alone (but the handle remains unchanged in its rotatability).

(II) In the fifth and sixth embodiments, the saddle support 5 and elastic-suspending means 6 are common to those of the first embodiment through the fourth embodiment (those illustrated are the saddle support and elastic-suspending means of the second embodiment), but the handle mechanism described above is of the following construction. In the fifth embodiment shown in FIGS. 9 and 10, the handle mechanism comprises a main shaft 47 independent of a front wheel control shaft (head shaft) 46 and connected at the rear end to the saddle support 5 and connected to the head shaft 46 so as to be vertically slidable and rotatable with respect to the shaft 46, a bilaterally extending sub-handle 48 connected to the head shaft 46, and a connecting pin means 49 connecting the sub-handle 48 vertically slidably and rotatably to the main handle 47. More particularly, the handle mechanism comprises a longitudinal rod 50 extending longitudinally between the main handle 47 and the saddle support 5 and connected at the rear end to the saddle support 5, forked portions 501, 501 bifurcated at the front end of the rod 50, a pair of vertical sleeves 51, 51 rotatably fitted over vertical levers 502, 502 extending vertically to the forked portions 501, 501 respectively, a pair of bilaterally and upwardly extending curved main handle levers 471, 471, connected to the sleeves 51, 51 respectively, upturned connecting pins 473, 473 protrudently provided in proximity with the handle grips 472, 472 of the main handle levers 471, 471 respectively, and a connecting member 52 fitted vertically slidably over the head shaft 46 and bridged between the pair of vertical sleeves 51 and 51, the sub-handle 48 being a T-shaped lever and being provided at both ends with pin slots 481, 481 which swingably permit the insertion of the connecting pins 473, 473 therethrough and being connected to pins 473 and 473.

Figure 10:
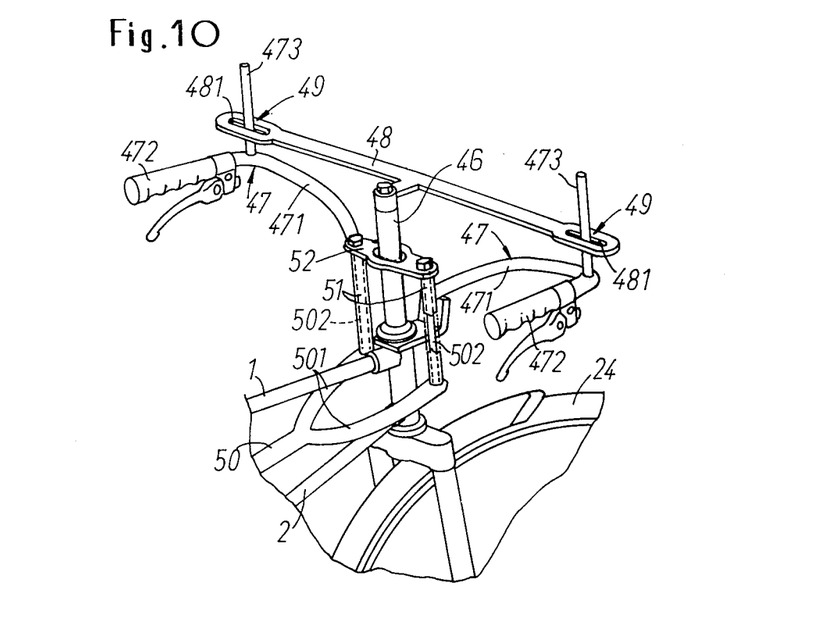
FIG. 10 is a perspective view showing a handle assembly of FIG. 9.

With the handle mechanism constructed as above, vertical motion of the head shaft 46 is transmitted to the sub-handle lever 48 and because the sub-handle 48 and the main handle 47 are connected to each other both by vertically slidable insertion of the connecting pins 473, 473 through the pin slots 481, 481 and by vertically slidable insertion of the connecting member 52 around the head shaft 46, the vertical motion of the sub-handle 48 is not transmitted to the main handle 47. But rotation of the main handle 47 about upright shafts 502 and 502 is transmitted from the sub-handle 48 through the connecting pin means 49 to the head shaft 46 to thereby enable the handle control of the front wheel 24.

Owing to the described function provided by the invention, the rider gets his body and hands together brought by spring means 6 into a suspended state with respect to the frames 1 and 2, and accordingly vertical motion caused by a rough road surface is not transmitted either to the driver's body or to his hands but the rider can have very comfortable feeling.

Figure 12:
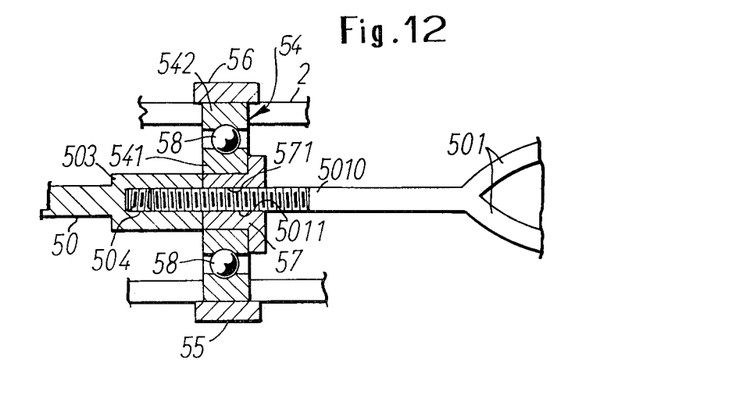
FIG. 12 is an enlarged sectional view taken along line XII-XII of FIG. 11.

In a sixth embodiment, consideration is given for further providing such handle mechanism with the following function. Namely, consideration is given for preventing any deformation or damage between the saddle support, the handle mechanism and the bicycle body not only by precluding twist rotation about the axis of the saddle support, which rotation may be effected by a sudden pedaling power imparted to the saddle support or an unexpected force applied from outside to the saddle support to thereby twistingly rotate the support but also by properly transmitting the momentary vertical motion of the saddle support to the handle mechanism. In FIGS. 11 and 12 there is shown a means 53 for preventing such deformation and damage. The deformation and damage preventing means 53 is disposed between the longitudinal rod 50 and the forked rod portions 501, 501, and includes a ball bearing case 54 having the longitudinal rod 50 and a forked rod end element 5010 journaled therein, and a pair of bilateral guide rods 55 and 56 bridged vertically between the upper frames 1, 1 and the lower frames 2, 2 so as to bring the ball bearing case 54 into rollable contact with the inside of the rods 55 and 56. In FIG. 12 which shows the means 53 in greater detail, a hollow tube 503 having internal threads 504 inside is disposed at the final end of the rod 50, and the forked rod element 5010 is also formed on the periphery with threads 5011. A bushing 57 having internal threads 571 corresponding to the threads 5011 is fitted into the internal race 541 of the ball bearing case 54, and internal threads 571 of the bushing 57 is threadedly engaged with the threads 5011 of the rod element 5010 with the rear end of the rod element 5010 extending beyond the bushing 57. The hollow tube 503 is screwed along its threads 504 around the projecting threads 5011, and the bushing 57 is further tightened to fix the rod 5010, the hollow tube 503 and bushing 57 together. Numeral 58 designates ball bearings.

The longitudinal rod 50 and the rod element 5010 are journaled in the ball bearing case 54 through the above procedure. A pair of bilateral guide rods 55 and 56 are made up of flat plates bridged respectively between the upper frames 1, 1 and the lower frames 2, 2 and there is left a slight gap between the inside surfaces of the plates and the outer race 542 of the ball bearing case 54.

With the construction of the bicycle as above, when there is produced the described type of twisting and vertical motion of the saddle support, the ball bearing case 54 is moved in frictional relation with either or both of the guide rods 55, 56 to thereby not only prevent such twisting but also enable the handle mechanism to move up and down in cooperation with the saddle support, with the result that deformation and damage between the saddle support, the handle mechanism and the bicycle body can be prevented by the cooperation between the three.

The invention has been described and illustrated with reference to numerous preferred embodiments, but it should be understood that the invention is not limited to the structures illustrated and that various other replacements, additions and modifications are possible within the appended claims without departing from the spirit of the invention.

I claim:

1. In a bicycle having an upper and lower frame; a saddle support having a saddle mounted on the upper end of said saddle support; means for elastically suspending said saddle support from said upper frame; drive crank means mounted to the lower end of said saddle support independently of said upper and lower frames; a front wheel control shaft; and a handle having handle means preventing transmission of vertical motion from said front wheel control shaft to said handle, said handle being connected to the saddle support independently of said front wheel control shaft, the improvement comprising:
- a longitudinal rod connected at one end to said saddle support and terminating at its other end into two forked portions each connected to a sleeve rotatably fitted over a lever, said levers being joined at their top portion by a connecting member having a slot in its center portion and rotatably and slidably fitted over said front wheel control shaft, said handle including a pair of curved upwardly extending handle levers each connected at its inner end to the upper portion of each of said sleeves, each of said handle levers having an upwardly extending connecting pin mounted on its upper surface; and
- a bilaterally extending sub-handle mounted at its center portion to the top of said front wheel control shaft and having a slot at each of its ends to slidably receive each of said upwardly extending connecting pins.

2. A bicycle according to claim 1 in which said longitudinal rod is provided with rotational vibration preventing means disposed between the end of said longitudinal rod and said forked portions.

3. A bicycle according to claim 2 in which said rotational vibration preventing means includes a ball bearing case having an inner race and an outer race with ball bearings, said case being journaled between the end of said longitudinal rod and said forked portions, and
- a pair of guide rods connected at their top ends to the upper frame and connected at their bottom ends to the lower frame and disposed in rollable contact between their inner surfaces and said ball bearing case.

* * * * *